(12) United States Patent
Momii et al.

(10) Patent No.: US 7,325,543 B2
(45) Date of Patent: Feb. 5, 2008

(54) COVERING MATERIAL FOR SOLAR THERMAL POWER GENERATING SYSTEM AND SOLAR THERMAL POWER GENERATING SYSTEM FORMED BY SPREADING THE COVERING MATERIAL

(75) Inventors: Tatsuo Momii, Yokohama (JP); Satoshi Shiratori, Ichihara (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 11/344,116

(22) Filed: Feb. 1, 2006

(65) Prior Publication Data
US 2006/0124168 A1    Jun. 15, 2006

Related U.S. Application Data

(63) Continuation of application No. PCT/JP2004/010942, filed on Jul. 30, 2004.

(30) Foreign Application Priority Data
Aug. 1, 2003 (JP) .............................. 2003-285227

(51) Int. Cl.
F03G 6/00 (2006.01)
(52) U.S. Cl. ...................... 126/707; 126/569; 126/624; 60/641.8
(58) Field of Classification Search ........ 126/624–626, 126/704, 707, 710, 621, 569, 561, 566, 623, 126/627, 696, 705, 652, 711; 290/55; 60/641.8; 135/909, 907, 85
See application file for complete search history.

(56) References Cited

U.S. PATENT DOCUMENTS 2,580,555 A * 1/1952 Kroeger ........................ 4/502
4,067,319 A * 1/1978 Wasserman .................. 126/634
4,084,598 A * 4/1978 Rainwater .................... 135/121
4,279,244 A * 7/1981 McAlister .................... 126/621
4,318,467 A * 3/1982 Acton ......................... 198/703
4,425,174 A * 1/1984 McLoughlin ................ 156/218
5,608,268 A * 3/1997 Senanayake ................. 290/54
RE37,498 E * 1/2002 Thomas ....................... 135/87
6,647,717 B2 * 11/2003 Zaslavsky et al. ............ 60/398
7,026,723 B2 * 4/2006 Moreno ....................... 290/55

(Continued)

FOREIGN PATENT DOCUMENTS

JP        63-422       1/1988

(Continued)

OTHER PUBLICATIONS

NEDO International Report, No. 869, Nov. 2001.

Primary Examiner—Steve McAllister
Assistant Examiner—Sarah E. Suereth
(74) Attorney, Agent, or Firm—Oblon, Spivak, McClelland, Maier & Neustadt, P.C.

(57) ABSTRACT

A covering material for solar thermal power generation system, characterized in that it is made of a film which has a tensile yield strength of at least 10 N/mm² according to JIS K7127, a solar radiation transmittance of at least 85% according to JIS R3106, and a retention of at least 80% against the initial value of the tensile breakage strength after 5000 hours of the sunshine carbon arc lamp weather test according to JIS B7753.

9 Claims, 4 Drawing Sheets

U.S. PATENT DOCUMENTS

2005/0139280 A1* 6/2005 Masui et al. ................ 138/121

FOREIGN PATENT DOCUMENTS

| JP | 1-296052 | 11/1989 |
| --- | --- | --- |
| JP | 2-1399 | 1/1990 |
| JP | 7-111831 | 5/1995 |
| JP | 9-184296 | 7/1997 |
| JP | 2701041 | 10/1997 |
| JP | 11-188819 | 7/1999 |
| JP | 2002-115917 | 4/2002 |
| JP | 2003-171488 | 6/2003 |

* cited by examiner

COVERING MATERIAL FOR SOLAR THERMAL POWER GENERATING SYSTEM AND SOLAR THERMAL POWER GENERATING SYSTEM FORMED BY SPREADING THE COVERING MATERIAL

TECHNICAL FIELD

The present invention relates to a covering material for solar thermal power generating system and a solar thermal power generating system formed by spreading the covering material. In more detail, the present invention relates to a covering material for solar thermal power generating system, which is excellent in mechanical strength, transparency and weather-resistance, and to a solar thermal power generating system formed by spreading the covering material.

BACKGROUND ART

In recent years, power generating methods for generating clean and renewable energy have been progressed to cope with fear of exhaustion of oil energy and environmental problem. As representative examples, wind power generation and solar-light-condensing power generation are mentioned. Wind power generation has already been practically used in Europe and Asia, but it has a problem that power-generation quantity significantly decreases when wind speed decreases. Further, in the solar light-condensing power generation which is a method of condensing solar light by using a parabolic mirror to obtain solar energy and using the solar energy to produce high-temperature vapor for driving a power generator. However, it has a problem that sufficient solar energy can not be obtained when sun light is prevented by cloud.

Recently as a new power generation method, a power generating system using solar energy called solar chimney has been proposed (for example, Non-Patent Document 1). This power generating system using solar energy has a construction comprising a circular heat collector having a diameter of 4 km and having a chimney of 1 km high in the center. The heat collector has a structure like a greenhouse having no peripheral wall. The heat collector is configured so that air heated in the heat collector moves inside a roof of the heat collector towards the center to which the slope is sloping up, and reaches the highest point at the center. The heated air is drawn into the chimney disposed at the center of the heat collector. At this time, a wind-power generating turbine disposed in the chimney generates electric power. Since the temperature in the heat collector is higher than the outside temperature in the solar chimney system, air flow is generated by the heated air in the heat collector and power-generation is continued even if sun light is prevented by cloud. Further, by disposing a heat accumulator in the heat collector, power-generation is possible even in night time by heating air by heat irradiation from the heat accumulator.

Further, in a solar light-condensing power generation, instead of a conventional method of condensing solar light into one point by a parabolic mirror, an improved solar light-condensing power generation method is proposed (for example, refer to Patent Document 1), according to which a curved rectangular mirror is used to condense solar light into a linear shape to produce a large quantity of high-temperature vapor at one time.

Non-Patent Document 1 describes that a vinyl resin can be used as a covering material to be used for a solar thermal power generation system. In a case where a material having insufficient weather-resistance is used as a covering material for a heat collector of a solar chimney which is intended to supply electric power almost permanently, periodic replacement is required and cost for such a replacing work of a roof of the heat collector having a large area, becomes high. As a result, there is a problem that power-generation cost is increased. Further, the wind pressure of air heated in the heat collector increases as the air moves toward the center. Therefore, when a material having insufficient mechanical strength is employed, support-structures have to be installed at a small interval, which causes a problem that solar light is blocked by such support-structures to reduce power-generation efficiency. On the other hand, in a case where a glass excellent in weather-resistance and mechanical strength, is employed, thick support-structures have to be provided at a small interval to support the weight of the glass, which causes a problem that solar light is blocked to reduce power-generation efficiency.

Therefore, in a solar thermal power generation system, development of a covering material excellent in mechanical strength, weather resistance and transparency, has been desired.

Patent Document 1: JP-A-2002-115917
Non-Patent Document 1: NEDO International Report No. 869 (published on Nov. 19, 2001)

DISCLOSURE OF THE INVENTION

Problems to be Solved by the Invention

It is an object of the present invention to provide a covering material for solar thermal power generation system, excellent in mechanical strength, transparency and weather resistance and excellent in working efficiency of covering a large-area heat collector, and to provide a solar thermal power generation system formed by spreading the covering material.

Means for Solving the Problems

The present invention provides a covering material for solar thermal power generation system, characterized in that it is made of a film which has a tensile yield strength of at least 10 N/mm$^2$ according to JIS K7127, a solar radiation transmittance of at least 85% according to JIS R3106, and a retention of at least 80% against the initial value of the tensile breakage strength after 5000 hours of the sunshine carbon arc lamp weather test according to JIS B7753.

Further, the present invention provides a solar thermal power generation system formed by spreading the covering material for solar thermal power generation system.

Effect of the Invention

The covering material for solar thermal power generation system of the present invention, has high tensile yield strength enabling to widen the interval of support-structures in the heat collector, and the covering material is excellent in transparency and provides excellent power-generation efficiency. Further, since the material is excellent in weather-resistance, it is not necessary to be replaced for a long time, which reduces maintenance cost. Further, by employing a wide-width film obtained by fusion-bonding, the heat collector can be covered efficiently. Further, by attaching a cable at the end of the film, the heat collector can be covered efficiently and easily.

EXPLANATION OF NUMERALS

Figure 1:
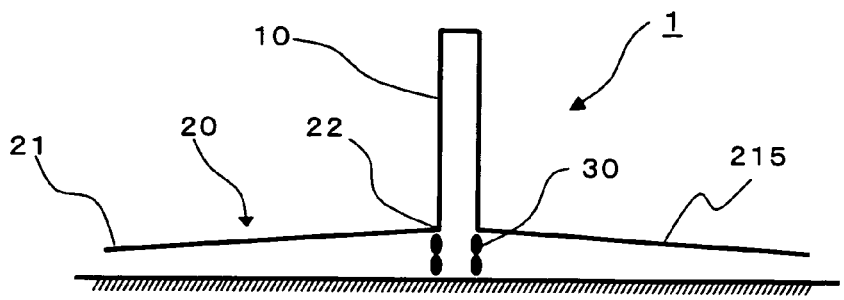
FIG. 1: A schematic cross-sectional view showing an example of a solar thermal power generation system according to the present invention.

1 Solar thermal power generation system
10 Chimney
20 Heat collector
21 Peripheral portion of heat collector
22 Center of heat collector
30 Power generator
201 Film
202, 203 and 205 Fusion-bonded portion
204 and 206 Reinforcement film
207 Cable
208 Fusion-bonded portion at the end of film
209, 210 and 211 Connecting jig
212 C-shaped pipe
213 Pipe for reinforcement wire
214 Ring for letting tension wire through
220 Reinforcement wire
221 Tension wire
230 and 231 Connecting portion
240 Pole
241 Support-structure to which a connecting jig is attached Best Mode for Carrying Out the Invention A film of the covering material for solar thermal power generation system of the present invention, has a tensile yield strength of at least 10 N/mm$^2$ according to JIS K7127, a solar radiation transmittance of at least 85% according to JIS R3106, and a retention of at least 80% against the initial value of the tensile breakage strength after 5000 hours of the sunshine carbon arc lamp weather test according to JIS B7753.

The film of the present invention has a tensile yield strength of at least 10 N/mm$^2$ according to JIS K7127. It is preferably at least 15 N/mm$^2$. When the film has a tensile yield strength of at least 10 N/mm$^2$, it is excellent in durability against wind pressure, which enables to reduce the number of support-structures to widen the interval of the support-structures. As a result, the number of support-structures can be reduced and cost can be reduced. Further, since sun light is less likely to be blocked by the support-structures, utilization efficiency of sun light can be increased and power-generation efficiency can be increased. The tensile yield strength is preferably as strong as possible. Usually, the upper limit of the tensile yield strength is 250 N/mm$^2$.

The film of the present invention has a solar radiation transmittance of at least 80% according to JIS R3106. The solar radiation transmittance is an index of transmittance for solar light consisting of UV light, visible light and near infrared light. The higher the index is, the more excellent in transmittance is. The solar radiation transmittance is preferably at least 85%, more preferably at least 90%. The solar radiation transmittance is theoretically at most 100%.

Further, the film has a transmittance for a radiation of 10 μm wavelength as a transmittance for infrared radiation, of preferably at most 50%, more preferably at most 30%, the most preferably at most 10%. The lower the transmittance for infrared radiation is, the less the infrared rays are radiated. When the transmittance for radiation of 10 μm wavelength, is within this range, little heat accumulated in the heat collector is radiated to the outside in nighttime, and thus the film is suitable for power generation of nighttime. The transmittance of infrared radiation is theoretically at least 0%.

The film of the present invention has a retention of at least 80% against the initial value of the tensile breakage strength after 5,000 hours of the sunshine carbon arch lamp weather test according to JIS B7753. More preferably, it has the retention of at least 85%. The retention is theoretically at most 100%. 5,000 Hours of the sunshine carbon arc lamp weather test, is said to be correspond to 10 years of actual exposure test in outdoors. Therefore, if the retention is within this range, the film is excellent in weather-resistance, the film is usable for a long time without replacement, and thus the film is suitable for solar thermal power generation system which is intended for permanent operation.

The thickness of the film of the present invention is preferably from 1 to 1,000 μm, more preferably from 10 to 500 μm, still more preferably from 50 to 300 μm.

The material to be employed for the film of the present invention, may, for example, be a fluororesin such as an ethylene tetrafluoroethylene type copolymer (ETFE), a tetrafluoroethylene-perfluoroalkyl vinyl ether copolymer (PFA), a tetrafluoroethylene-hexafluoropropylene copolymer (FEP), a tetrafluoroethylene-hexafluoropropylene-vinylidene fluoride copolymer (THV), polyvinylidene fluoride (PVdF) or polyvinyl fluoride (PVF), an acrylic resin such as polymethyl acrylate or an ethylene-methyl acrylate type copolymer, a methacryl resin such as polymethyl methacrylate, polyethyl methacrylate or an ethylene-methacrylate copolymer, a polyester resin such as polyethylene terephthalate or polybutylene terephthalate, or a polycarbonate resin.

The material is preferably at least one member selected from the group consisting of ETFE, PFA, FEP, THV, PVdF and PVF. More preferably, it is at least one member selected from the group consisting of ETFE, FEP and PVF, most preferably ETFE. ETFE is excellent in tensile yield strength, solar radiation transmittance and weather resistance.

The ETFE in the present invention is preferably a copolymer of tetrafluoroethylene and ethylene, or a copolymer of tetrafluoroethylene, ethylene and another monomer.

Above another monomer may, for example, be a fluoroolefin such as chlorotrifluoroethylene, hexafluoropropylene (HFP), perfluoro(alkyl vinyl ether) (PFAV) or vinylidene fluoride; a polyfluoroalkylethylene such as $CH_2=CHR^f$ (hereinafter, $R^f$ indicates a polyfluoroalkyl group having a carbon number of 1 to 8.) or $CH_2=CFR^f$; or a polyfluoroalkyl trifluorovinyl ether such as $CF_2=CFOCH_2R^f$. These may be used alone or used in combination of at least two types.

Above another monomer is preferably at least one member selected from the group consisting of HFP, PFAV, $CH_2=CHR^f$ and $CH_2=CFR^f$. The PFAV is preferably $CF_2=CFOR^f$, wherein $R^f$ is more preferably perfluoroalkyl group having a carbon number of 3 to 6, the most preferably $C_3F_7$. $R^f$ in $CH_2=CHR^f$, is more preferably a perfluoroalkyl group having a carbon number of 3 to 6, most preferably $C_4F_9$. $R^f$ in $CH_2=CFR^f$, is more preferably a perfluoroalkyl group having a carbon number of 3 to 6, most preferably $C_3F_7$. The above another monomer is most preferably $CH_2=CHR^f$.

In terms of the composition of the ETFE, the molar ratio of "monomer units based on tetrafluoroethylene"/"monomer units based on ethylene", is preferably from 70/30 to 30/70, more preferably from 65/35 to 40/60, most preferably from 60/40 to 45/55.

In a case where monomer units based on another comonomer are contained, the content of the monomer units based on another comonomer, is preferably from 0.01 to 30 mol %, more preferably from 0.05 to 15 mol %, the most preferably from 0.1 to 10 mol %, based on the sum of the moles of the monomer units based on tetrafluoroethylene and the moles of the monomer units based on ethylene.

The film of the present invention is preferably a film having one surface subjected to a hydrophilic treatment. Particularly, in a case where the film has inner surface subjected to hydrophilic treatment, the surface is excellent in dripping property and accordingly, water droplets are unlikely to be present inside of the covering material even if dew-condensation occurrs. By this effect, sunlight blockage by the water droplets is reduced and the film is excellent in power-generation efficiency. As the method for forming a hydrophilic-treatment surface, a wet method or a dry method is used. As the wet method, a method of coating with a solution of hydrophilic material by a roller, a method of spraying such a solution, a method of applying such a solution by a brush, a method of coating with such a solution by a coater, or the like may be mentioned. The wet method is preferably a method of coating with a solution of hydrophilic material by a coater, or a method of spraying such a solution.

As the dry method, a sputtering method, a vacuum vapor deposition method, a CVD (Chemical Vapor Deposition) method or an ion-plating method of a hydrophilic material, may be mentioned. The dry method is preferably a sputtering of hydrophilic material, which has high productivity and excellent in durability of hydrophilic property.

As the hydrophilic material, an inorganic colloid sol of e.g. $SiO_2$ or $Al_2O_3$, a hydrophilic resin of e.g. polyvinyl alcohol or acrylic acid, a metal oxide of e.g. Si, Sn, Ti, Nb, Al or Zn, may be mentioned. In particular, a sputtering of a metal oxide of e.g. Si, Sn or Ti, is preferred. In this case, a metal oxide of Si or Ti is more preferably employed.

When the film of the present invention has a hydrophilic treatment surface, it is preferred that the underside of the roof of the heat collector of the solar thermal power generation system is the hydrophilic-treatment surface.

From now, the present invention will be described with reference to drawings. However, the present invention is not limited to these.

FIG. 1 is a schematic cross-sectional view showing an example of the solar thermal power generation system according to the present invention. A solar thermal power generation system 1 comprises a chimney 10, a heat collector 20 and a power generator 30. The heat collector 20 has a roof 215 including a film 201. The roof 215 has a continuous slope sloping up from the periphery 21 of the heat collector towards the central portion 22 of the heat collector. Solar light heats up air inside the heat collector 20. Heated air moves along the roof 215 of the heat collector 20 towards the center 22 of the heat collector. Namely, the air moves from the outer periphery 21 of the heat collector towards the center 22 of the heat collector as it is heated. The heated air is sucked into the chimney 10 at the center 22 of the heat collector, and the air is discharged from the top of the chimney 10. A wind-power generation turbine is disposed in the power generator 30 in the vicinity of the center 22 of the heat collector. When the heated air moves from the heat collector 20 to the chimney 10, the wind power generation turbine is rotated to generate electricity.

The diameter of the heat collector in the solar thermal power generation system, is preferably from 100 to 8,000 m, more preferably from 800 to 5,000 m. The height of the chimney 10 is preferably from 100 to 2,000 m, more preferably from 200 to 1,500 m. Further, the diameter of the chimney is preferably from 5 to 300 m, more preferably from 10 to 200 m.

The film of the present invention is preferably a film having a large width formed by fusion bonding ends of plural films. Such a film having a large width can efficiently cover the heat collector. As a method for fusion bonding, a thermal fusion bonding, an ultrasonic fusion bonding, a high-frequency fusion bonding or the like may be mentioned. A thermal fusion bonding is preferred since it forms fusion bonded portions having high strength and it is excellent in productivity.

Figure 2:
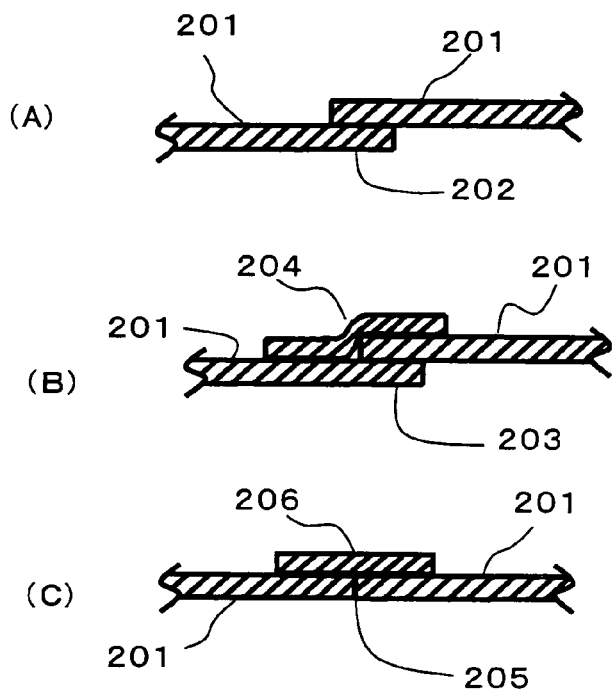
FIG. 2: Cross-sectional views (A), (B) and (C) each showing an example of fusion-bonded portion of films

FIG. 2 includes cross-sectional views (A), (B) and (C) showing examples of fusion-bonded portions of films. Namely, they are cross-sectional views respectively showing three examples of fusion-bonded structures at fusion-bonded portions of two films. The fusion-bonded portion of films shown in FIG. 2(A) being a fusion-bonded portion view, is formed by overlapping ends of two films 201 and fusion bonding the overlapped portion. The fusion-bonded portion of films shown in FIG. 2(B), is formed by overlapping ends of two films 201, overlaying a reinforcement film 204 on the overlapped portion, and fusion bonding the portion. The fusion-bonded portion of films shown in FIG. 2(C), is formed by placing ends of two films 201 close to each other, overlapping a reinforcement film 206 on such a portion where the ends are placed closely to each other, and fusion bonding the portion.

The width of each overlapped portion in the fusion-bonded portion of FIG. 2(A) and fusion-bonded portion of FIG. 2(B), is preferably from 1 to 200 mm, more preferably from 3 to 100 mm, still more preferably from 5 to 60 mm. The width of each of the reinforcement film 204 and the reinforcement film 206 is preferably from 5 to 250 mm, more preferably from 10 to 100 mm, still more preferably from 15 to 70 mm.

The film of the present invention is preferably a film having a cable attached to its end. When a film has a cable attached to its end, the heat collector can be efficiently and easily covered with the film by inserting the cable into a connecting jig attached to a support-structure. The method for attaching the cable to the end is preferably a method of folding the periphery of the film, enclosing the cable in the folded periphery and thermally fusion-bonding the surfaces of the folded periphery to each other.

Figure 3:
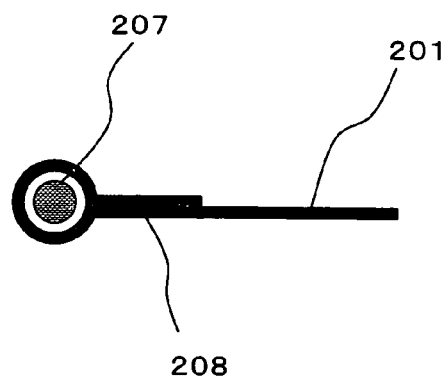
FIG. 3: A cross-sectional view showing an example of an end of a film to which a cable is attached.

FIG. 3 is a cross-sectional view showing an example of an end of a film to which a cable is attached. A cable 207 is placed on an end of a film 201. The end of the film is folded to enclose the cable. The overlapping portion of the folded end of the film 201 and a portion of the film 201 in contact with the folded end, namely film surfaces of the fusion-bonded portion 208, are thermal-fusion-bonded. By this process, the end of the film 201 to which the cable 207 is attached, is formed. The cable may, for example, be a resin cable, a resin-coated metal cable or a metal cable. A resin cable is preferred since it unlikely mechanically damage the film. Among resin cables, a polyvinyl alcohol resin cable is more preferred. The diameter of the cable is preferably 2 to 50 mm, more preferably 5 to 30 mm. When one side of the film 201 is subjected to a hydrophilic treatment, it is preferred that non-hydrophilic treatment surfaces are fusion bonded to each other. When non-hydrophilic-treated surfaces are fusion-bonded to each other, strength of the fusion-bonded portion increases and the fusion-bonded portion becomes less likely to be peeled off, such being preferred.

The connecting jig is preferably a jig having a shape formed by connecting the backs of C-shaped pipes each having a slit and having a C-shaped cross section.

Figure 4:
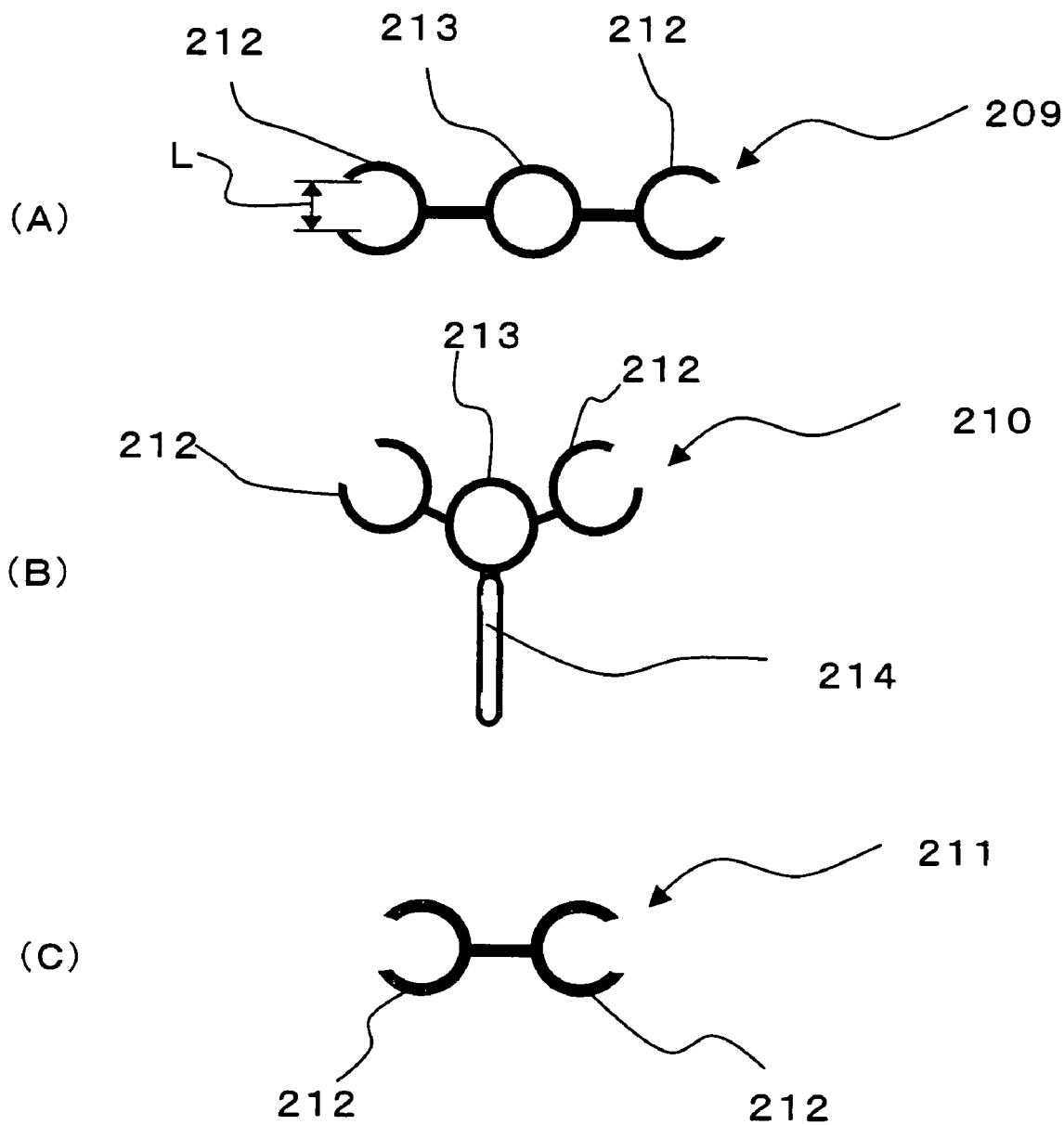
FIG. 4: Cross-sectional views (A), (B) and (C) each showing an example of connecting jig.

FIG. 4 includes cross-sectional views (A), (B) and (C) each showing an example of connecting jig. The connecting jig 209 shown in FIG. 4(A), has a shape formed by linearly connecting a C-shaped pipe 212, a pipe 213 for reinforcement wire, and a C-shaped pipe 212. The connecting jig 210 shown in FIG. 4(B), has a shape formed by connecting a C-shaped pipe 212, a pipe 213 for reinforcement wire, and a C-shaped pipe 212, in V-shape, wherein a ring 214 for letting a tension wire through is attached to the pipe 213 for reinforcement wire. The connecting jig 211 shown in FIG. 4(C) has a shape formed by connecting two C-shaped pipes 212 without intervention of a pipe for reinforcement wire. The connecting jig may have the pipe 213 for reinforcement wire but do not have to have the pipe. The connecting jig preferably has the pipe 213 for reinforcement wire since the rigidity of the connecting jig can be increased by letting a wire through the pipe 213 for reinforcement wire. The slit width L of the C-shaped pipe 212 is larger than the thickness of the film 201 but smaller than the diameter of the cable. L is preferably from 5 to 90%, more preferably from 30 to 80%, of the diameter of the cable. The material of the connecting jig may, for example, be a resin, a fiber-reinforced resin or a metal. The material is preferably a metal, and among these, aluminum is the most preferable.

Figure 5:
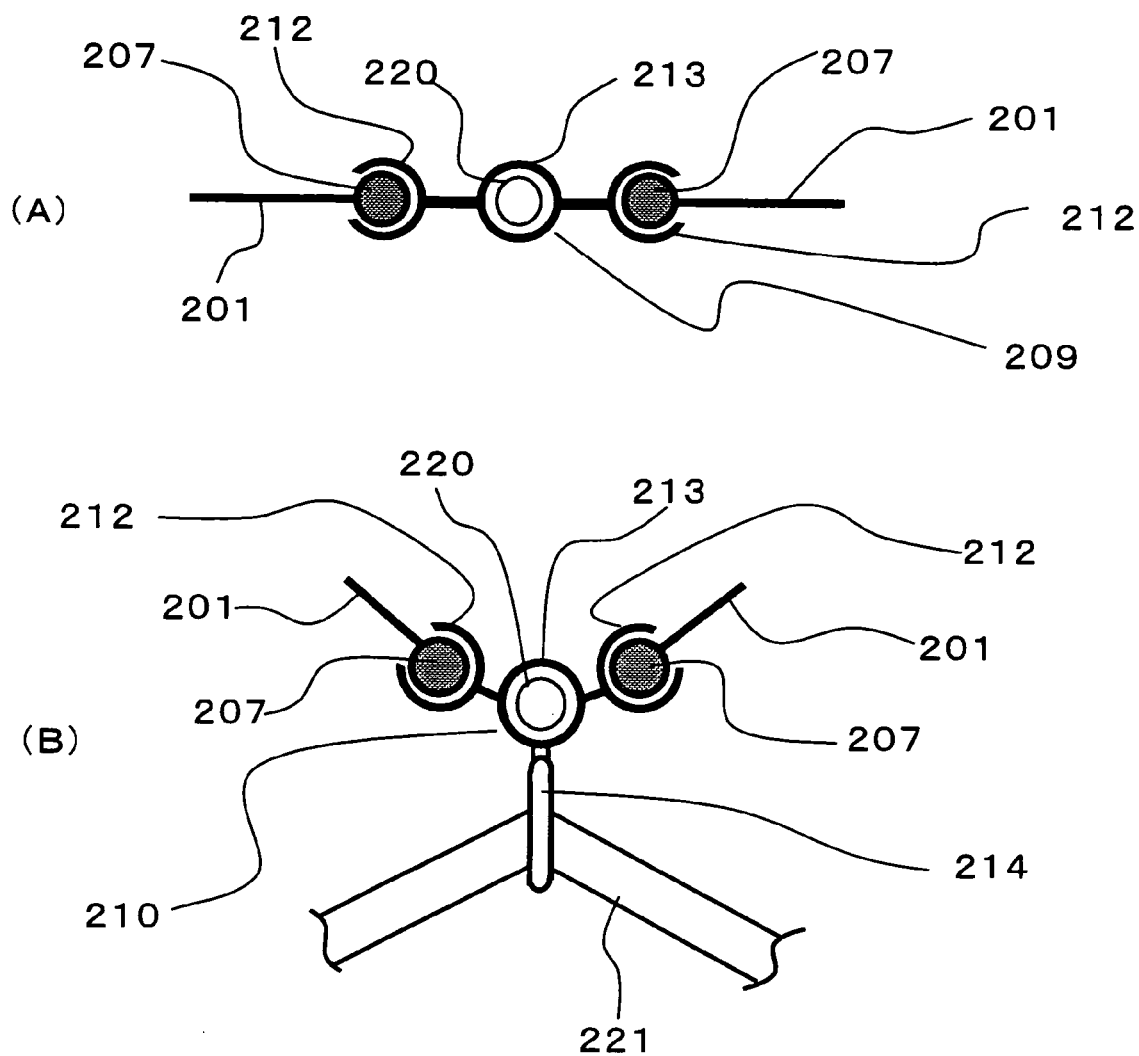
FIG. 5: Cross-sectional views (A) and (B) each showing an example of connecting portion.

FIG. 5 includes cross-sectional views (A) and (B) showing examples of the connecting portion. Ends of two films 201, to which the respective cables 207 are attached, are fit into the respective two C-shaped pipes 212 of the connecting jig 209 respectively, whereby the two films are connected to each other via the connecting jig 209. By letting a reinforcement wire 220 through a pipe 213 for reinforcement wire, the rigidity of the connecting jig 209 is increased. In the connecting portion shown in FIG. 5(B), Ends of two films 201, to which the respective cables 207 are attached, are fit into the respective two C-shaped pipes 212 of the connecting jig 210, whereby the two films are connected to each other via the connecting jig 210. By letting a reinforcement wire 220 through a pipe 213 for reinforcement wire, the rigidity of the connecting jig 210 is increased. By letting a tension wire 221 through a ring 214 for letting the tension wire through, the tension wire 221 is pulled downwardly, whereby the film 201 is extended.

Each of the reinforcement wire 220 and the tension wire 221 may, for example, be a resin wire, a resin-coated metal wire or a metal wire. A metal wire is preferred since it has high rigidity. The diameter of the reinforcement wire 220 is preferably from 2 to 50 mm, more preferably from 5 to 30 mm. The diameter of the tension wire 221 is preferably from 2 to 50 mm, more preferably from 5 to 30 mm.

Figure 6:
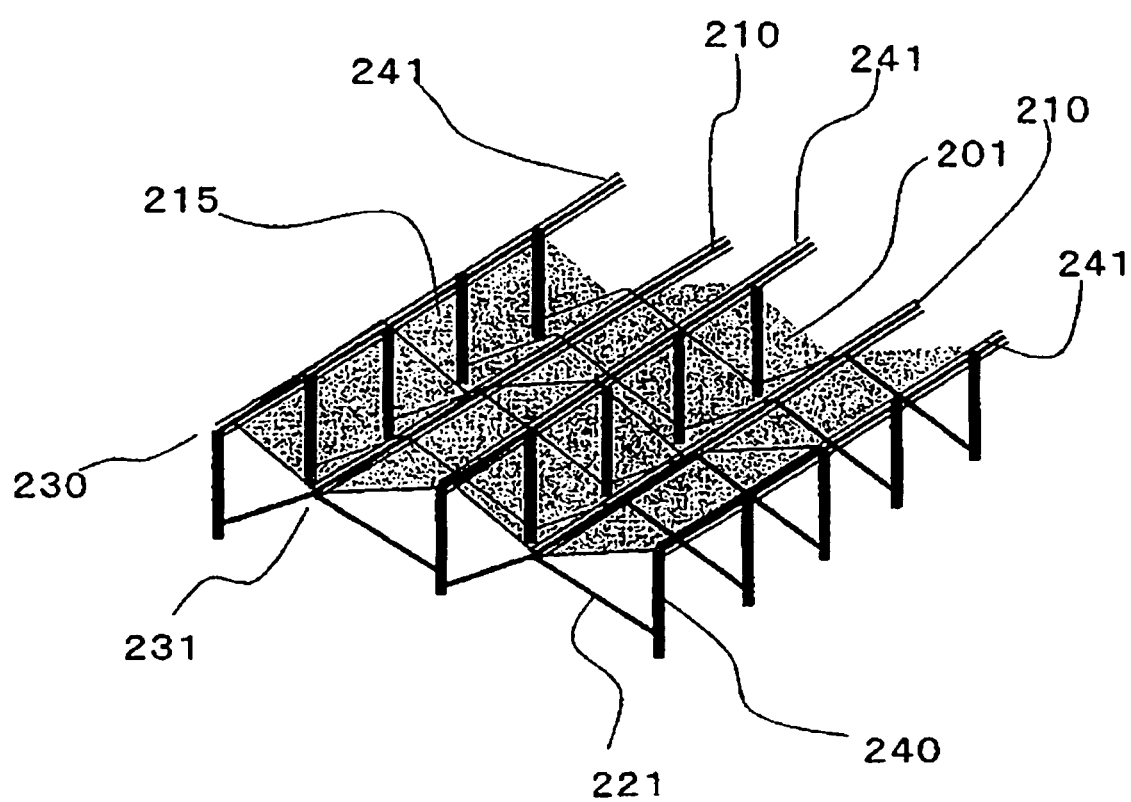
FIG. 6: A partial perspective view showing an example of a heat collector of a solar thermal power generation system.

FIG. 6 is a partial perspective view showing an example of a heat collector of a solar thermal power generation system. Poles 240 are erected and disposed on a ground at a predetermined interval. A roof 215 formed by connecting plural films 201 by connecting jigs 209 and connecting jigs 210, is placed on the top side of poles 240. Each of the connecting jigs 209 of the roof 215 is attached to a support-structural member 241. The support-structural member 241 to which the connecting jig 209 is attached, is placed on the poles 240 so that the top ends of the poles 240 butt the support-structural member 241. A tension wire 221 is let through a ring 214 for letting the tension wire through, of each of the connecting jig 210. The end of the tension wire 221 is disposed at a lower part of the pole 240. By pulling the connecting jig 210 by the tension wire 221 downwardly, the roof 215 is extended to form a heat collector 20. In the heat collector 20, a heat-absorber such as a water-accumulating pipe may be provided. By providing such a heat absorber, the power-generation efficiency of solar thermal power generation system is further increased. Further, it is possible to warm up air inside of the heat-absorber 20 by a heat radiation from the heat absorber, to generate electricity.

The covering material for solar thermal power generation system of the present invention, is constituted by a film excellent in mechanical strength, transparency and weather resistance, and accordingly, it is usable also for greenhouses for facility cultivation, livestock house, compost houses, simple warehouses, atriums, arcades, gymnasiums, pavilions for exhibition, botanic gardens, carports, swimming pools and the like as the application other than a solar thermal power generation system.

EXAMPLES

From now, the present invention will be described in detail with reference to Examples. However, the present invention is not limited to these Examples.

Evaluation Method of Film

Tensile yield strength, solar radiation transmittance and retention of tensile breaking strength are measured by the following methods.

Tensile Yield Strength (N/mm$^2$)

This is measured according to JIS K7127. Specifically, a test sample of 20 mm wide×50 mm long is prepared from a film by using a razor, and a tensile test is carried out at a tensile test speed of 5 mm/min by using a tensile tester (manufactured by Toyo Baldwin Co., Ltd., Large Tensilon). The first bending point in a tensile stress-strain curve recorded in a recorder, is defined as a yield load, and a tensile yield strength T was calculated from the following formula (1).

$$T=P/S \tag{1}$$

T (N/mm$^2$): tensile yield strength, P (N): yield load, S (mm$^2$) cross-sectional area of test sample Solar Radiation Transmittance (%)

This is measured according to JIS R3106. Specifically, a test sample of 50 mm square was prepared from a film by using a razor, and its transmittance within a wavelength range of from 340 nm to 1,800 nm was measured by using a UV-visual spectrophotometer (manufactured by Shimadzu Corporation, UV3100PC), and a solar radiation transmittance was calculated using the weighting coefficients and the formula described in appendix table 2 of JIS R3106.

Retention (%) of Tensile Breaking Strength

A sunshine carbon arc lamp type weather-resistance test according to JIS B7753 was carried out for 5,000 hours. The tensile breaking strengths of the film before and after the test were measured according to JIS K7127. From the tensile breaking strengths before and after the test, the retention M was calculated from the following formula (2). As the retention M is higher, the sample is more excellent in weather-resistance.

$$M=(Q/R)\times 100 \tag{2}$$

M (%): retention of tensile breaking strength, Q(N): tensile breaking strength after the test, R(N): tensile breaking strength before the test

Example 1

Example of Preparing a Film

ETFE was prepared by a solution polymerization method described in JP-A-6-157616. The copolymerization composition of the ETFE, was that monomer units based on tetrafluoroethylene/monomer units based on ethylene/monomer units based on $CH_2=CHC_4F_9=52.4/46.4/1.2$ (molar ratio). The ETFE was molded by using a melt extruder with a T-shaped die, at a die-temperature of 300° C. to produce a film of 100 μm in thickness. The tensile yield strength, the solar radiation transmittance and the weather resistance of the ETFE film obtained, were measured. The results are shown in Table 1.

Comparative Examples 1 and 2

Films of Comparative Examples

The same measurements as those of Example 1 were carried out with respect to a polyvinyl chloride film (Nobi-Ace, a tradename, manufactured by Mitsubishi Chemical MKV Company, 100 μm thick), a polyethylene film (AGRISTAR, a tradename, manufactured by Mitsubishi Chemical MKV Company, 100 μm thick). The results are shown in Table 1.

TABLE 1

|  | Ex. 1 | Comp. Ex. 1 | Comp. Ex. 2 |
| --- | --- | --- | --- |
| Film | ETFE | PVC | PE |
| Thickness (μm) | 100 | 100 | 100 |
| Tensile yield strength T (N/mm²) | 15 | No yield point | 8 |
| Solar radiation transmittance (%) | 94 | 93 | 88 |
| Retention M (weather resistance) (%) | 90 | 0 | 30 |

Example 2

Example of Preparing a Wide Film

Two ETFE films having a width of 130 cm obtained by Example 1, were fusion bonded at a fusion-bonding temperature of 260° C. by using a thermal fusion bonder (manufactured by Queen Light Electronic Industries Ltd., Heat Sealer LHP-W705). This step was repeated to produce a large-width film having a width of 5 m. An ETFE film A was obtained by simply overlapping and fusion bonding portions within 3 cm from the ends of films (fusion-bonded portion of FIG. 2(A)). An ETFE film B was obtained by overlapping portions within 1 cm from the ends of films, and further overlapping a reinforcement film of 3.5 cm wide on the overlapping portion (the fusion-bonded portion of FIG. 2 (B)). An ETFE film C was obtained by butting the ends of films, overlapping a reinforcement film of 3.5 cm wide on the batted portion so as to bridge the butted portion, and fusion bonding the portion (fusion-bonded portion of FIG. 2(C)). Cross sections of the fusion-bonded portions of these ETFE film A1, ETFE film A2 and ETFE film A3, were shown in FIG. 2.

Example 3

Construction of a Solar Thermal Power Generation System

A cable (PVA cable) made of polyvinyl alcohol resin having a diameter of 1 cm was attached to the end of a ETFE film. Specifically, the peripheral portion of the ETFE film was folded so as to wrap the PVA cable to accommodate the PVA cable. Surfaces of the peripheral portion of the ETFE film folded in a loop shape were fusion-bonded to fix the PVA cable to the end of the film, to prepare a ETFE film having a PVA cable attached to its end. The cross section of the end of the ETFE film having a PVA cable attached to its end, is shown in FIG. 3. Then, using a connecting jigs, the ETFE film having a PVA cable attached to its end, was inserted into a connecting jig 209 and a connecting jig 210. The connecting jig 209 is fixed to a support-structural member, and the ETFE film covers the support-structural member and poles. A tension wire is let through a ring for letting tension wire, of the connecting jig 210. By pulling the connecting jig downwardly by the tension wire and fixing the end of the wire to a lower portion of the pole, the roof is extended to form a heat collector. Further, chimney is formed and a wind power generation turbine was installed around the center of the heat collector to form a power generation unit, whereby a solar thermal power generation system is constructed. Cross sections of the connecting jig 209 and a connecting jig 210 are shown in FIG. 4, and the cross section of a connecting jig to which a ETFE film having a PVA cable attached to its end, is fitted, is shown in FIG. 5, and a perspective view of a support-structural member and poles covered with the film, namely a perspective view of the heat collector, is shown in FIG. 6.

From Table 1, it is understandable that the ETFE film is excellent in tensile yield strength, solar radiation transmittance and weather resistance, and is therefore excellent as a covering material for solar thermal power generation system. Further, by repeating the fusion-bonding of the cross sectional structure of FIG. 2, a wide width film can be easily obtained. As shown in FIG. 3 and FIG. 4, by using a film having a PVA cable attached to its end, and a connecting jig, and by using a covering method shown in FIG. 5, it is possible to cover the heat collector of a solar thermal power generation system effectively and easily.

INDUSTRIAL APPLICABILITY

The covering material for solar thermal power generation system of the present invention is constituted by a film excellent in mechanical strength, transparency and weather-resistance, whereby it is extremely useful as a covering material for solar thermal power generation system which can be used for a long time and excellent in utilization efficiency of solar light.

The entire disclosure of Japanese Patent Application No. 2003-285227 filed on Aug. 1, 2003 including specification, claims and summary is incorporated herein by reference in its entirety.

What is claimed is:

1. A solar thermal power generation system, comprising a heat collector having a roof formed by fitting an end of a covering material having a cable attached to its end, into C-shaped pipes of a connecting jig having two C-shaped pipes, support structures and poles, a chimney and a power generator;

wherein the covering material for the solar thermal power generation system comprises a film which has a tensile yield strength of at least 10 N/mm2 according to JIS K7127, a solar radiation transmittance of at least 85% according to JIS R3106, and a retention of at least 80% against the initial value of the tensile breakage strength after 5000 hours of the sunshine carbon arc lamp weather test according to JIS B7753, wherein the film is a wide-width film formed by fusion-bonding ends of a plurality of films.

2. The solar thermal power generation system according to claim 1, wherein the film is made of at least one member selected from the group consisting of an ethylene/tetrafluoroethylene copolymer, a tetrafluoroethylene/perfluoroalkyl vinyl ether copolymer, a tetrafluoroethylene/hexafluoropropylene copolymer, a tetrafluoroethylene/hexafluoropropylene/vinylidene fluoride copolymer, a polyvinylidene fluoride and a polyvinyl fluoride.

3. The solar thermal power generation system according to claim 1, wherein the film is a film having a hydrophilic treated surface on one side.

4. The solar thermal power generation system according to claim 1, wherein the film is a film having a cable attached to its end.

5. The solar thermal power generation system according to claim 4, wherein the film having a cable attached to its end, is a film obtained by folding back the peripheral portion of the film to enclose the cable and thermally fusion-bonding the surfaces at the folded-back peripheral portion.

6. The solar thermal power generation system according to claim 5, wherein the surfaces to be thermally fusion-bonded are non-hydrophilic treated surfaces.

7. The solar thermal power generation system as defined in claim 1, wherein the covering material for the solar thermal cower generation system is stretched.

8. The solar thermal power generation system according to claim 1, wherein the connecting jig is a connecting jig having two C-shaped pipes and a pipe for a reinforcement wire, wherein a reinforcement wire is inserted in the pipe for a reinforcement wire.

9. The solar thermal power generation system according to claim 1, wherein the roof is a roof spread by pulling the covering material downwardly by a tension wire.

* * * * *